(12) United States Patent
Wier

(10) Patent No.: US 6,325,416 B1
(45) Date of Patent: Dec. 4, 2001

(54) BELT TENSIONER

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 08/929,736

(22) Filed: Sep. 15, 1997

(51) Int. Cl.$^7$ .................................................. B60R 22/195
(52) U.S. Cl. ........................... 280/806; 297/480; 242/374
(58) Field of Search ................. 180/268; 280/801.1, 280/802, 803, 806, 807, 808; 297/480, 472; 60/632, 635, 637, 638; 242/374

(56) References Cited

U.S. PATENT DOCUMENTS

| | | | |
|---|---|---|---|
| 4,258,934 | * | 3/1981 | Tsuge et al. ........................ 280/806 |
| 4,860,698 | * | 8/1989 | Patrichi et al. ..................... 60/635 |
| 5,037,134 | * | 8/1991 | Tabata ............................... 280/806 |
| 5,207,618 | * | 5/1993 | Nishizawa .......................... 297/480 |
| 5,310,219 | * | 5/1994 | Fohl .................................. 280/806 |
| 5,358,275 | * | 10/1994 | Fohl .................................. 280/806 |
| 5,460,094 | * | 10/1995 | Ono ................................... 102/272 |
| 5,468,019 | * | 11/1995 | Blase et al. ........................ 280/806 |
| 5,481,940 | * | 1/1996 | Betz .................................. 280/806 |
| 5,495,790 | * | 3/1996 | Greiner .............................. 280/806 |
| 5,519,997 | * | 5/1996 | Specht ............................... 60/632 |
| 5,871,235 | | 2/1999 | Wier .................................. 280/806 |
| 5,887,897 | * | 3/1999 | Gill et al. .......................... 280/806 |

FOREIGN PATENT DOCUMENTS

| | | |
|---|---|---|
| 2364235 | 6/1975 | (DE) . |
| 2411702 | 9/1975 | (DE) . |
| 43 05 049-A1 * | 8/1994 | (DE) . |
| 29608210 | 5/1996 | (DE) . |

* cited by examiner

*Primary Examiner*—Lanna Mai
*Assistant Examiner*—Ruth Ilan
(74) *Attorney, Agent, or Firm*—Tarolli, Sundheim, Covell, Tummino & Szabo L.L.P.

(57) ABSTRACT

A belt tensioner comprises a cylinder with an inner shell surface, a piston with a piston head, a working space in the cylinder into which compressed gas enters upon activation of the tensioner to drive the piston, a part engaging the safety belt, and a traction means attached to the piston and to the belt engaging part. The piston head delimits the working space and is formed by an annular sealing plate on which an essentially axially extending thin sealing lip is formed. The lip is adapted to resiliently yield radially and contact the inner shell surface of the cylinder in a biased condition.

9 Claims, 1 Drawing Sheet

BELT TENSIONER

FIELD OF THE INVENTION

The invention relates to a belt tensioner.

BACKGROUND OF THE INVENTION

Known belt tensioners comprise a linear piston and cylinder drive, whose piston may be driven by a compressed gas entering a working space and moves a part engaging the safety belt via a traction means attached to the piston.

A belt tensioner of this type is disclosed in the European patent publication 0 616 928 A1. The piston provided in this case is composed of a plurality of parts, between which a preferably plastically deformable damping element is arranged. On one part at the face end thereof facing the working space a bead is provided which is conically formed outward and constitutes a rigid sealing edge. A cylinder is manufactured by cutting off a suitable portion of a tube which is made by drawing and, therefore, could be of indefinite length. Since the bore diameter of the tube varies owing to wear of the tools employed for machining it, substantial variations are also liable to occur in the bore diameter from one cylinder to another. Therefore, it is not in every cylinder that a rigid sealing edge can ensure an optimum sealing effect so that in the case of a cylinder with a large bore diameter compressed gas is able to flow past the piston out of the working space, something which reduces the performance of the belt tensioner.

BRIEF DESCRIPTION OF THE INVENTION

The invention provides a more effective belt tensioner, in the case of which leakage flow from the working space may be reduced while nevertheless adhering to a simple design. The belt tensioner according to the invention comprises a cylinder with an inner shell surface, a piston with a piston head, a working space in the cylinder into which compressed gas enters upon activation of the tensioner to drive the piston, a part engaging the safety belt, and a traction means attached to the piston and to the belt engaging part. The piston head delimits the working space and is formed by an annular sealing plate on which an essentially axially extending thin sealing lip is formed. The lip is adapted to resiliently yield radially and contact the inner shell surface of the cylinder in a biased condition.

The sealing lip has a relatively large overall axial length and may consequently be readily bent elastically and adapt itself to the course of the barrel face of the cylinder and to the variations in the bore diameter so that hardly any leakage will occur.

In the preferred embodiment of the invention the sealing lip widens out conically toward its free edge resting against the shell surface with the result that the introduction of the piston into the cylinder in the course of assembly is facilitated. If the free edge externally, furthermore, has an axially short collar, same may be so designed that during fitting the piston in the cylinder it is partly abraded or cut back and accordingly adapts itself to the cylinder's inner shell surface. This operation may be likened to so-called grinding in. If the annular sealing plate is made of aluminum and the cylinder is made of steel, excellent sealing results can be achieved by the "grinding-in-effect".

In the case of the preferred embodiment the sealing plate is made concave toward the working space and increases the size of the working space, into which compressed gas flows from a container for the storage of compressed gas or from a pyrotechnical gas generator. Accordingly the piston and cylinder linear drive may be made with a generally shorter overall length, something which is aimed for in view of the in any case limited amount of space available in vehicles. The sealing lip is formed by the peripheral wall left on the sealing plate.

A further provision is that the piston is composed of only a few readily-manufactured parts. In the case of the preferred embodiment of the invention a guide sleeve is provided to the side of the sealing plate, such sleeve having a central opening conically narrowing toward the working space, such opening being adjoined without any intervening ledge by an opening which is provided in the sealing plate and also narrows conically. The locking body is designed in the form of a conical sleeve and press fitted in the openings so that owing to the wedging effect the parts are connected together by friction. In this design the frictional force between parts is even further increased by the pressure of the gas acting on the sealing plate so that there is a self-reinforcing effect.

BRIEF DESCRIPTION OF THE INVENTION

DETAILED DESCRIPTION OF PREFERRED EMBODIMENTS

Figure 1:
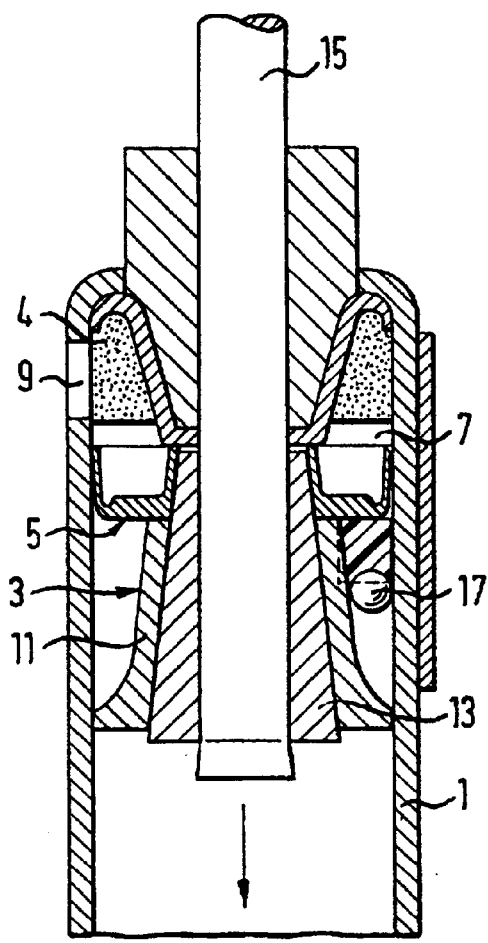
FIG. 1 is a longitudinal section taken through the piston and cylinder linear drive as part of the belt tensioner in accordance with the invention.

In FIG. 1 the upper section of a piston and cylinder linear drive as a part of a belt tensioner will be seen. In the interior of the cylinder 1 a piston 3, which is composed of a plurality of parts, and a gas generator 4 are placed. A sealing plate 5 constitutes a piston head and delimits a working space 7 in the interior of the cylinder 1. An opening 9 in the top portion of the cylinder 1 connects the gas generator 4 with an ignition unit (not illustrated). The piston 3 furthermore comprises a guide sleeve 11 with an opening conically narrowing toward the working space 7 and into which a locking member 13 in the form of a conical collet is press fitted. The locking member 13 extends toward the working space 7 out of the guide sleeve 11 and into a central opening in the sealing plate 5, which adjoins the opening in the guide sleeve 11 without any ledge and with the same cone angle. The locking member 13 constitutes a conical seat for the sealing plate 5 and the guide sleeve 11, which owing to the locking member 13 are frictionally connected with one another.

On the locking member 13 a traction means 15 in the form of a traction cable is attached in a conventional manner, which in turn is part attached to a part engaging the safety belt.

The external shell surface of the guide sleeve 11 widens out like a trumpet toward the end remote from the working space 7 until it finally substantially contacts the inner shell surface of the cylinder 1. The piston 3 hence runs on two axially offset points inside the cylinder 1 and is well protected against running skew. The external shell surface of the guide sleeve 11 is peripherally engaged by a plurality of locking bodies 17 in the form of balls, of which only one is illustrated.

Figure 2:
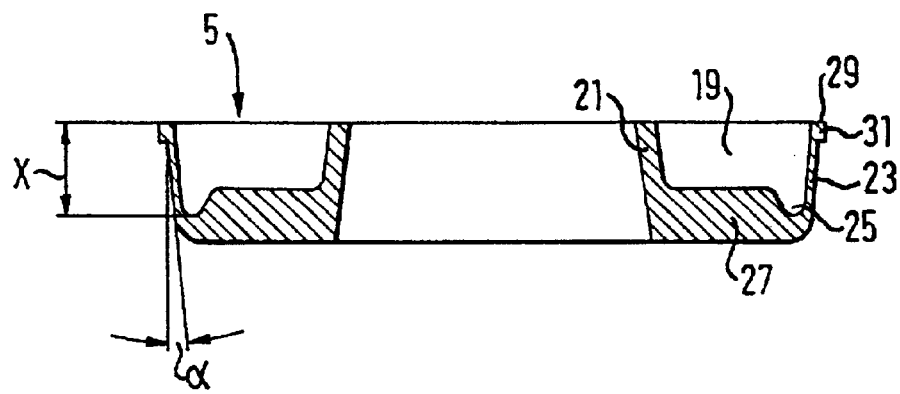
FIG. 2 shows a longitudinal section taken through the sealing plate as a part of the piston depicted in FIG. 1.

The generally annular sealing plate 5 is illustrated in more detail in FIG. 2. On the side facing the working space 7 the sealing plate 5 is made concave or hollow so that the working space 7 around the volume referenced 19 is increased. The hollowed out part is delimited in the radial direction on the inner side by a strong wall 21 and on the outer side by a thin peripheral wall forming a sealing lip 23. The bottom end of the hollowed out part is further hollowed out adjacent to the sealing lip 23 by an annular groove 25, serving to increase axial length x of the sealing lip 23. The bottom section 27 of the sealing plate 5 is strong enough to ensure that it is not being bent when major pressure forces occur.

The sealing lip 23 widens out toward its free edge 29. The external shell surface of the sealing lip 23 in this case extends at a cone angle a of at the most approximately 10° to the longitudinal axis of the cylinder 1. Accordingly the introduction of the piston 3 into the cylinder 1 is facilitated for assembly of the piston and cylinder unit. On its outer side the free edge 29 has an axially short collar 31 engaging the inner shell surface of the cylinder 1 in a biased condition so that there is no gap left between the sealing lip 31 and the inner shell surface of the cylinder 1. The axially short collar 31 is slightly abraded or cut back on introduction of the piston 3 into the cylinder 1 and consequently adapts itself to the shape of the inner barrel face. In order to reduce frictional resistance of the piston 3 in the cylinder 1 the piston 3 is coated with a dry lubricant.

If an accident occurs the pyrotechnical propellant is ignited in the gas generator 4 via the opening, and compressed gas will flow into the working space 7 accelerating the piston 3 in the direction as indicated by the arrow. The compressed gas also flows in this case into the hollowed out part 19 of the sealing plate 5 and thrusts the continuous sealing lip 23 radially outward with the result that there will be a self-reinforcing sealing effect.

Once the piston 3 has reached its lowermost position and the belt tensioner is drawn taut, the locking members 17 will prevent any sliding back of the piston 3. The locking members 17 may then impress themselves into the wall of the cylinder 3 and plastically deform same so that they also have a force limiting effect.

The sealing plate 5 consisting of a light metal such as for instance aluminum, is manufactured by flow pressing or deep drawing.

What is claimed is:

1. A belt tensioner comprising a cylinder with an inner shell surface, a piston with a piston head, a working space in said cylinder into which compressed gas enters upon activation of said tensioner to drive said piston, and a traction means attached to said piston and connected with a safety belt, said piston head delimiting said working space and being formed by an annular sealing plate on which an essentially axially extending thin sealing lip is formed, said lip being adapted to resiliently yield radially and contact said inner shell surface of said cylinder in a biased condition, said sealing lip having a free edge which externally has an axially short collar, said collar, engaging said inner shell surface of said cylinder, said collar being partly abraded on introduction of said piston into said cylinder and accordingly adapting itself to said inner shell surface of said cylinder.

2. The belt tensioner as claimed in claim 1, wherein said sealing plate is made of aluminum.

3. The belt tensioner as claimed in claim 1, wherein said sealing plate is hollowed out on a side that is toward said working space to define a hollowed out part and wherein said sealing lip is a peripheral wall left on said sealing plate, said wall radially adjoining said hollowed out part.

4. The belt tensioner as claimed in claim 1, wherein said sealing lip extends outwardly conically toward its free edge engaging said shell surface.

5. The belt tensioner as claimed in claim 4, wherein said sealing lip has an external shell surface extending outwardly toward is free edge at a cone angle a relative to a longitudinal axis that is parallel to the longitudinal axis of the cylinder such that a is at the most approximately 10°.

6. The belt tensioner as claimed in claim 1, wherein a guide sleeve engaging said sealing plate on a side remote from said working space is provided and wherein a locking member on which said traction means is attached is provided, each of said sealing plate and said guide sleeve being connected frictionally with said locking member.

7. The belt tensioner as claimed in claim 6, wherein said guide sleeve has a central opening which conically narrows toward said working space and which is adjoined without any ledge by an opening in said sealing plate, said opening in said sealing plate also narrowing conically and wherein said locking member is a taper sleeve press fitted in said openings.

8. The belt tensioner as claimed in claim 6, wherein said guide sleeve has an outer shell surface on which at least one locking element is arranged, said locking element being adapted to prevent reverse movement of said piston after pretensioning has taken place.

9. A belt tensioner comprising a cylinder with an inner shell surface, a piston with a piston head, a working space in said cylinder into which compressed gas enters upon activation of said tensioner to drive said piston, and a traction means attached to said piston and connected with a safety belt, said piston head delimiting said working space and being formed by an annular sealing plate on which an essentially axially extending thin sealing lip is formed, said lip being adapted to resiliently yield radially and contact said inner shell surface of said cylinder in a biased condition, wherein a guide sleeve engaging said sealing plate on a side remote from said working space is provided and a locking member on which said traction means is attached is provided, each of said sealing plate and said guide sleeve being connected frictionally with said locking member, and wherein said guide sleeve has a central opening which conically narrows toward said working space and which is adjoined without any ledge by an opening in said sealing plate, said opening is said sealing plate also narrowing conically and wherein said locking member is a taper sleeve press fitted in said openings.

* * * * *

UNITED STATES PATENT AND TRADEMARK OFFICE
CERTIFICATE OF CORRECTION

PATENT NO. : 6,325,416 B1
DATED : December 4, 2001
INVENTOR(S) : Franz Wier

It is certified that error appears in the above-identified patent and that said Letters Patent is hereby corrected as shown below:

<u>Title page,</u>
Insert:
-- [30] Foreign Application Priority Data

September 20, 1996  (DE)  296 16 414.3 --.

Signed and Sealed this

Third Day of June, 2003

JAMES E. ROGAN
*Director of the United States Patent and Trademark Office*